US006555976B2

(12) United States Patent
Thompson

(10) Patent No.: US 6,555,976 B2
(45) Date of Patent: Apr. 29, 2003

(54) EAST-WEST DISTORTION CORRECTION

(75) Inventor: Donald G. Thompson, Romsey (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/915,654

(22) Filed: Jul. 26, 2001

(65) Prior Publication Data
US 2002/0030765 A1 Mar. 14, 2002

(30) Foreign Application Priority Data

Jul. 28, 2000 (GB) .............................. 0018453

(51) Int. Cl.[7] ................................ G09G 1/04
(52) U.S. Cl. ................. 315/371; 315/408; 315/411
(58) Field of Search .................. 315/371, 403, 315/405, 408, 410, 411

(56) References Cited

U.S. PATENT DOCUMENTS

| 4,594,534 | A | * | 6/1986 | Haferl | ........................ 315/408 |
| 4,634,937 | A | * | 1/1987 | Haferl | ........................ 315/371 |
| 4,687,972 | A | * | 8/1987 | Haferl | ........................ 315/371 |
| 5,115,171 | A | * | 5/1992 | Haferl | ........................ 315/371 |
| 5,194,784 | A | * | 3/1993 | Tripod | ........................ 315/408 |
| 6,297,602 | B1 | * | 10/2001 | Tripod | ........................ 315/411 |

FOREIGN PATENT DOCUMENTS

| JP | 01316071 A | 12/1989 | .......... H04N/3/185 |
| WO | 9821882 A1 | 5/1998 | .......... H04N/3/185 |

* cited by examiner

Primary Examiner—Hoang Nguyen
(74) Attorney, Agent, or Firm—Steven R. Biren

(57) ABSTRACT

An apparatus for the correction of East-West distortion of images produced on the screen of a picture tube. More particularly, it concerns an electronic circuit for dynamically controlling the AC component of the drive signal to an East-West amplifier (14) in a picture tube horizontal scanning system. The electronic circuit comprises an input (44,66) for receiving a signal related to the beam current of the tube, an output for connection to the input of the East-West amplifier, a capacitive element (32,64), and an active control device (30,60) for controlling the capacitive element in response to the signal at the circuit input.

21 Claims, 2 Drawing Sheets

EAST-WEST DISTORTION CORRECTION

BACKGROUND OF THE INVENTION

The present invention relates to correction of East-West distortion of images produced on the screen of a picture tube. More particularly, it concerns an electronic circuit for controlling the AC component of the drive signal to an East-West amplifier in a picture tube horizontal scanning system.

The proposed circuit seeks to improve an existing East-West correction system for the horizontal scanning function of a television or monitor picture tube. The known system comprises a diode modulator which varies the scan current to the deflection coils of the picture tube in response to a voltage drive from an East-West amplifier, without significantly affecting the secondary waveforms and supplies generated by the horizontal output stage.

The output of the East-West amplifier has a DC component which determines the line scan width, and an AC (parabolic) component that corrects an inherent pincushion distortion of the outer vertical edges of the raster.

Although a circuit using discrete components can generate the drive waveform required by the East-West amplifier, it is customary to employ a specialised geometry-correcting integrated circuit (IC). Such ICs provide a close approximation to the requirement of most picture tubes, which can be pre-set within close tolerances using memory registers within the IC. Both the DC and AC components of the drive waveform are set and stored for each display format (aspect ratio selection). However, there is now a range of picture tubes with more extreme geometric correction requirements, which are not met by existing or currently proposed geometry-controlling ICs.

This problem, which is referred to as "Dynamic East-West correction", arises from the change in the raster shape and size that arises from the variation in the Extra High Tension (EHT) potential as a function of the beam current. The beam current varies strongly in response to the picture content on the screen.

Within the existing ICs, this correction is applied to the East-West drive in response to a signal voltage derived from a beam current detection circuit. This voltage represents the variation in EHT potential from which the required correction can be computed. This correction ensures that the display does not "breathe" during changes of picture content. In the present ICs this correction does provide an accurate correction of the DC (width) component, but the AC component is not corrected dynamically.

SUMMARY OF THE INVENTION

The present invention seeks to provide automatic dynamic correction of the AC component of the drive signal to the East-West amplifier in response to the normal EHT variation.

According to the invention, an electronic circuit is provided for controlling the AC component of the drive signal to an East-West amplifier in a picture tube horizontal scanning system, the circuit comprising an input for receiving a signal related to the beam current of the tube, an output for connection to the input of the amplifier, a capacitive means coupled to the output of the electronic circuit, and an active control device for controlling the capacitive means in response to the signal at the circuit input.

The circuit of the invention is able to achieve continuous variation of the AC component correction, responding accurately to the beam current information, and producing acceptable raster shape at all levels, whilst adding minimal cost.

This may be implemented by application of a large capacitor to the input port of the East-West amplifier. An active control device, such as a semiconductor "resistance", is driven from the beam current information to control the effect of the capacitor. The capacitor is preferably connected in series with the active control device.

The proposed circuit may be applied to a system set up initially for a perfect raster at maximum EHT (i.e. low beam current condition with a crosshatch test pattern). In this case, as the EHT voltage falls the parabolic correction must be reduced to counteract the barrel distortion that results and the circuit aims to fulfil this function.

Preferably, the active control device is a bipolar transistor. It may be a NPN transistor connected between the capacitive means and ground. In particular, a close approach to the required control characteristic may be achieved by using a NPN transistor with its emitter grounded and its collector connected to the capacitor. In this unconventional mode, the input base current controls the effective resistance at the collector. The sense of the control signal for the NPN transistor may be of opposite polarity to that of the beam current signal and in that case, polarity inversion means may be connected between the circuit input and the transistor. This can suitably be provided by a single amplifier stage, which can be configured to form a high impedance interface, as well as setting the operating range of the circuit to model the required control characteristic over the range of operating currents for a particular picture tube.

Alternatively, PNP transistor or a FET may be employed as the active control device. In a PNP based configuration, the transistor may be connected between the capacitive means and a low impedance power supply. In a preferred arrangement, the collector of the transistor is connected to the capacitive means and its emitter connected to the power supply.

Other arrangements of the active control device and capacitive means besides those described above may be used. For example, with a NPN transistor, the capacitive means may be connected between its emitter and the East-West amplifier with its collector connected to ground, or its emitter may be connected to ground via the capacitive means and its collector connected to the amplifier. In the latter case, it may be appropriate to connect a resistor between the emitter and base of the transistor to control uncertainty due to the current gain of the transistor. Similarly, with a PNP transistor, the capacitive means may alternatively be connected between the emitter of the transistor and the low impedance power supply, with its collector connected to ground, for example.

Preferably, means for controlling the operating characteristics of the circuit are provided between its input and the active control device, such as the amplifier stage noted above in relation to the NPN based embodiment.

In some circumstances, the effect of the circuit is not symmetrical at the upper and lower corners of the image displayed on the picture tube. This is an inherent feature of the combination of a capacitor and resistor in series. This problem may be overcome by applying a sawtooth waveform to the control signal at the base input of the transistor. The circuit may therefore include a second input for receiving a waveform to improve the symmetry of the control applied by the circuit. This has no effect in the low-current condition when the transistor is turned off and a beneficial effect at other times. In a NPN transistor based configuration the waveform is preferably a negative-going field sawtooth, whilst where a PNP transistor is used as the active control device of the circuit, the waveform is preferably a positive-going sawtooth.

A known deflection coil drive system and embodiments of the invention will now be described by way of example with reference to the accompanying drawings, in which.

DESCRIPTION OF THE PREFERRED EMBODIMENTS

Figure 1:
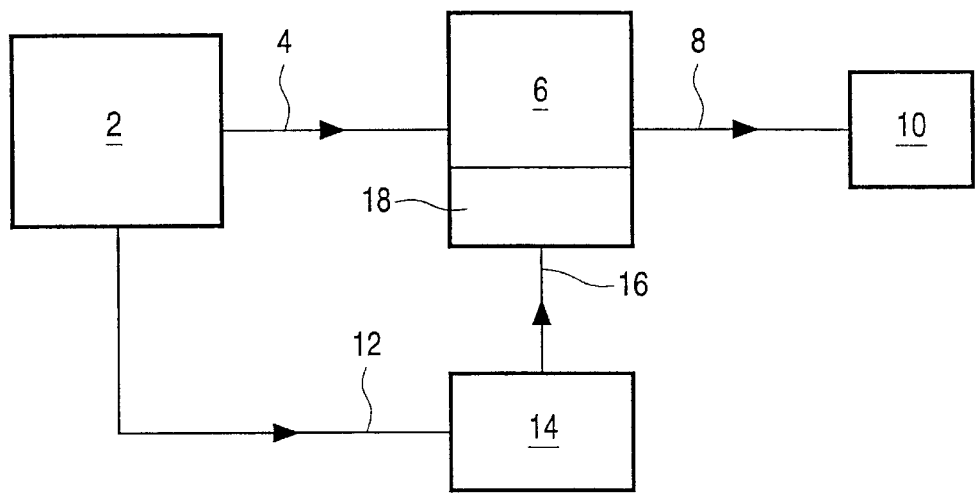
FIG. 1 shows a block diagram of a known system for driving the horizontal deflection coils of a picture tube.

FIG. 1 illustrates schematically the primary features of a known system for driving the horizontal deflection coils of a picture tube. A geometry controlling IC 2 provides a horizontal scan drive signal along line 4 to a horizontal scan generator 6. The generator outputs a horizontal scan current along line 8, which is connected to the horizontal deflection coils 10.

The IC 2 also generates a raster correction signal, which is fed to an East-West drive amplifier 14 via line 12. The East-West drive amplifier in turn produces a drive voltage on line 16 which is inputted to a diode modulator 18 within the horizontal scan generator 6. The diode modulator adjusts the horizontal scan current outputted by the generator in response to the drive voltage on line 16.

As noted above, the correction signal provided by the IC 2 dynamically corrects the DC component of the amplifier output, but not the AC component. This may lead to barrel type pincushion distortion of the outer vertical edges of the displayed image whenever the beam current is high.

Figure 2:
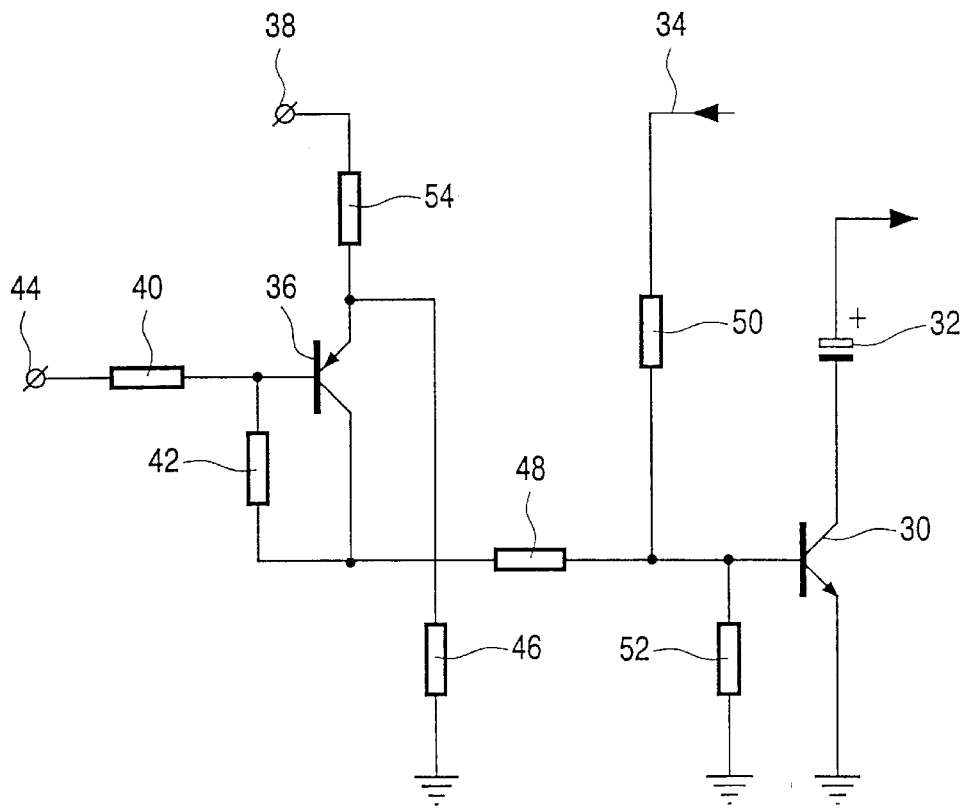
FIG. 2 shows an electronic circuit according to one embodiment of the invention for controlling the AC component of the drive signal to an East-West amplifier.
Figure 3:
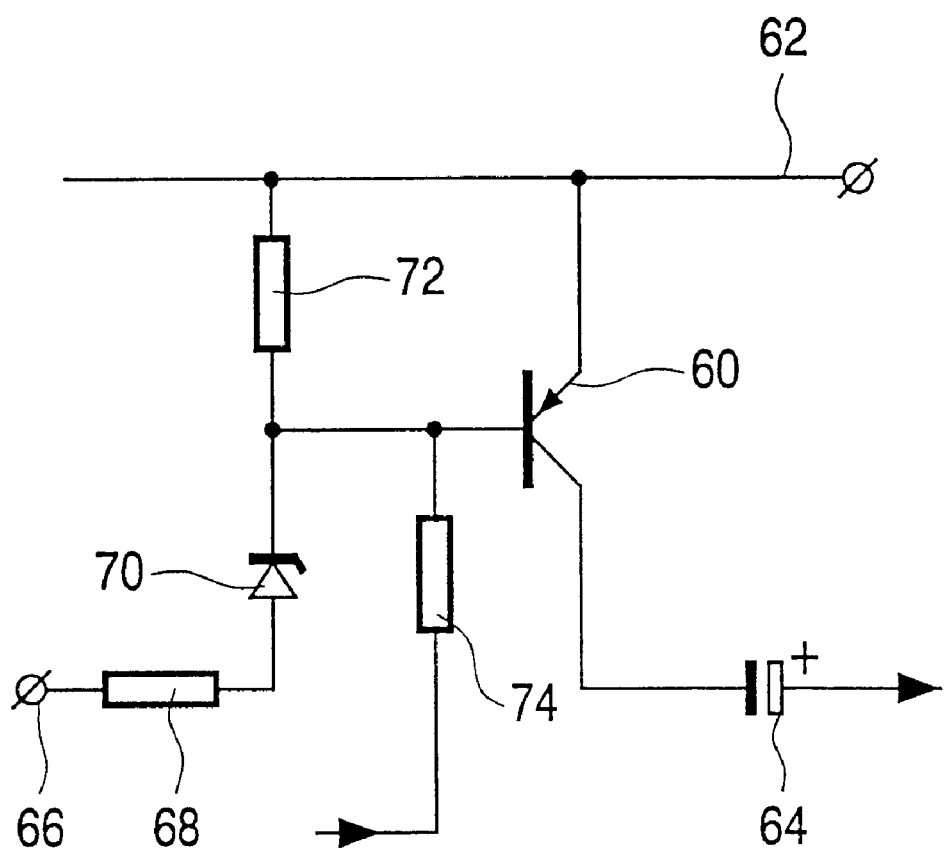
FIG. 3 shows an alternative embodiment of the invention to that of FIG. 2.

Circuits embodying the invention which address this problem are shown in FIGS. 2 and 3. The circuit of FIG. 2 is implemented using a NPN transistor as the active control device, whilst that of FIG. 3 instead employs a PNP transistor.

Considering the circuit of FIG. 2 first, it comprises a controlling NPN transistor 30, with its emitter connected to ground and its collector connected to a large capacitor 32. A correctly polarised 100 µF capacitor would be suitable for this purpose. The circuit output at the other side of the capacitor is inputted to the East-West amplifier. Where the effect of the circuit is not symmetrical at the upper and lower corners of the displayed image, this can be substantially corrected by application of an appropriate negative-going sawtooth waveform to input 34. Such a sawtooth waveform may be available directly in some applications of the circuit. Otherwise, it could be derived simply using known techniques.

In use, a signal voltage derived from a beam current detection circuit is applied to the circuit input 44. The beam current is usually detected in the line output stage of a television receiver and converted to a voltage signal that is passed to the IC 2. As the sense of the control signal for the NPN transistor 30 is of opposite polarity to that provided from the detection circuit, a high impedance interface is provided with a PNP transistor 36. This is typically powered from a 12V DC supply connected at point 38. The PNP transistor stage provides polarity inversion, as well as converting the operating range of the circuit to model the control characteristic required over the range of operating currents for the picture tube. A high resistance network formed by resistors 40 and 42 determines the cut-in point, the operating slope, and the upper control limit at which the PNP stage intentionally saturates in order to provide the desired characteristics. Resistor 42 is connected between the base and collector of transistor 36, whilst resistor 40 is connected between the transistor base and the input 44. By virtue of the high input resistance presented by the circuit of FIG. 2, it has negligible effect on the existing functions of geometry correction and beam current limiting applied by the IC 2. Resistors 46 and 54 provide a voltage offset at the emitter of transistor 36. Resistor 54 is connected between the DC supply at point 38 and the transistor emitter, whilst resistor 54 is connected between the emitter and ground potential.

Typical values for the resistors of FIG. 2 are as follows:

| 40 | 1.5 MOhm |
|---|---|
| 42 | 220 kOhm |
| 46 | 470 kOhm |
| 48 | 150 kOhm |
| 50 | 100 kOhm |
| 52 | 8.2 kOhm |
| 54 | 24 kOhm. |

It will be appreciated that these values may be modified as appropriate to suit particular requirements in a given application of the circuit.

An example of a circuit embodying the invention which includes a PNP transistor 60 as its active control device is shown in FIG. 3. The transistor emitter is connected to a low impedance power supply (typically 12V DC) via voltage rail 62. Its collector is connected to a one side of a capacitor 64, the other side of the capacitor being connected in use to the East-West amplifier. As in the embodiment of FIG. 2, a correctly polarised 100 µF capacitor would be suitable. Input 66 is provided for receiving a signal voltage from a beam current detection circuit. This is applied to the base of the transistor 60 via a resistor 68 and a Zener diode 70 (having a 5V rating for example). The Zener diode provides threshold control for the circuit, and in combination with resistor 68 is selected to control as required the circuit operating characteristics. A resistor 72 is provided between the transistor base and the voltage rail 62. As with the circuit of FIG. 2, asymmetry between the upper and lower corners of the displayed images may be addressed by application of a sawtooth waveform to the base of the transistor, via a resistor 74, in this case using a positive-going waveform.

Typical values for the resistors of FIG. 3 are as follows:

| 68 | 150 kOhm |
|---|---|
| 72 | 8.2 kOhm |
| 74 | 100 kOhm |

The circuits of FIGS. 2 and 3 are in use connected to the input port of the East-West amplifier 14 to which the correction is to be applied. With a high gain amplifier, this point is the point of lowest voltage amplitude (a virtual earth), thus ensuring that the active control transistor's resistive quality is active over the range of signal current from the geometry control IC 2 or another source.

From reading the present disclosure, other variations and modifications will be apparent to persons skilled in the art.

Such variations and modifications may involve equivalents and other features which are already known in the design, manufacture and use of East-West correction systems and which may be used of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

The Applicants hereby give notice that new Claims may be formulated to any such features and/or combinations of such features during the prosecution of the present Application or any further Application derived therefrom.

What is claimed is:

1. An electronic circuit for controlling the AC component of the drive signal to an East-West amplifier in a picture tube horizontal scanning system, the circuit comprising; an input for receiving a signal related to the beam current of the picture tube, an output for connection to the input of the East-West amplifier, a capacitive means coupled to the output of the electronic circuit, and an active control device for controlling the capacitive means in response to the signal at the circuit input.

2. An electronic circuit as claimed in claim 1 wherein the capacitive means is connected in series with the active control device.

3. An electronic circuit as claimed in claim 1 wherein the active control device is a bipolar transistor.

4. An electronic circuit as claimed in claim 3 wherein the active control device is a NPN transistor.

5. An electronic circuit as claimed in claim 4 wherein the transistor is connected between the capacitive means and ground.

6. An electronic circuit of claim 4 wherein polarity inversion means are connected between the circuit input and the transistor.

7. An electronic circuit as claimed in claim 3 wherein the active control device is a PNP transistor.

8. An electronic circuit as claimed in claim 7 wherein the transistor is connected between the capacitive means and a low impedance power supply.

9. An electronic circuit of claim 1 wherein means for controlling the operating characteristics of the circuit are provided between its input and the active control device.

10. An electronic circuit of claim 1 including a second input for receiving a waveform to improve the vertical symmetry of the raster produced by the scanning system.

11. An electronic circuit of claim 10 wherein the waveform is substantially a sawtooth waveform.

12. An integrated circuit comprising the circuit of claim 1.

13. A television receiver or monitor comprising the circuit of claim 1.

14. In an electronic circuit including an output for connection to an input of an East-West amplifier, a capacitive means, and an active control device, a method of supplying a drive signal to an East-West amplifier for a CRT horizontal scanning system, which comprises;
   deriving a signal determined by the beam current of the CRT,
   applying said signal to an input of the electronic circuit,
   coupling the capacitive means to the circuit output and to the active control device, and
   controlling the capacitive means via the active control device in response to a signal at the input of the electronic circuit, and in a manner to compensate an AC component of the drive signal.

15. The method as claimed in claim 14 which further comprises applying an electric waveform to a second input of the electronic circuit and which is adapted to improve the vertical symmetry of the raster produced by the scanning system.

16. A method as claimed in claim 15 wherein the waveform is substantially a sawtooth waveform.

17. An electronic circuit for control of the drive signal to an East-West amplifier in a picture tube horizontal scanning system, the circuit comprising:
   an input for receiving a signal dependent upon the beam current of the picture tube,
   an output for connection to an input of the East-West amplifier,
   a capacitive means,
   an active control device, and
   means for coupling the capacitive means and the active control device to one another and to the output of the electronic circuit, and wherein
   in response to the signal at the circuit input, the active control device provides a continuous and smooth control of the capacitive means so as to control an AC component of the drive signal at the circuit output in a manner that will reduce any pincushion distortion present in the picture tube.

18. The electronic circuit as claimed in claim 17 wherein the active control device is a transistor connected in series with the capacitive means to the output of the electronic circuit.

19. The electronic circuit as claimed in claim 17 further comprising means for supplying to a control input of the active control device a signal waveform adapted to improve the vertical symmetry of a raster produced by the horizontal scanning system.

20. The electronic circuit as claimed in claim 19 wherein the signal waveform has a sawtooth shape.

21. The electronic circuit as claimed in claim 17 further comprising polarity inversion means coupled between the circuit input and a control input of the active control device and arranged to control the operating characteristics of the electronic circuit.

* * * * *